(12) United States Patent
Schluentz et al.

(10) Patent No.: US 12,077,233 B1
(45) Date of Patent: Sep. 3, 2024

(54) METHOD OF ASSEMBLING A TRUCK

(71) Applicant: Ford Global Technologies, LLC, Dearborn, MI (US)

(72) Inventors: Daniel Schluentz, New Hudson, MI (US); Kirk E. Sanborn, Rochester, MI (US); Jon Midbo, Chesterfield, MI (US); Daniel J. Deinek, Shelby Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/338,660

(22) Filed: Jun. 21, 2023

(51) Int. Cl.
*B62D 65/14* (2006.01)
*B62D 65/06* (2006.01)

(52) U.S. Cl.
CPC ............. *B62D 65/14* (2013.01); *B62D 65/06* (2013.01)

(58) Field of Classification Search
None
See application file for complete search history.

(56) References Cited

U.S. PATENT DOCUMENTS

| | | | |
|---|---|---|---|
| 4,759,489 A | 7/1988 | Pigott | |
| 4,813,736 A | 3/1989 | Schubert et al. | |
| 6,550,849 B1 | 4/2003 | Dosdall | |
| 6,719,361 B1 * | 4/2004 | Adams | B62D 33/0612 |
| | | | 296/190.01 |
| 6,773,056 B2 * | 8/2004 | Fischer | B62D 33/06 |
| | | | 296/190.08 |
| 6,918,169 B2 | 7/2005 | Mathew | |
| 7,635,156 B2 | 12/2009 | Thomas et al. | |
| 2009/0048742 A1 | 2/2009 | Kiridena et al. | |
| 2019/0126995 A1 | 5/2019 | Staser et al. | |
| 2020/0148292 A1 | 5/2020 | Hosbach et al. | |

FOREIGN PATENT DOCUMENTS

| | | | | |
|---|---|---|---|---|
| DE | 102009036755 A1 * | 4/2010 | ............. | B62D 33/06 |
| DE | 102009004153 A1 * | 7/2010 | ............. | B62D 33/06 |
| DE | 102017205601 A1 * | 10/2018 | ......... | B62D 33/0612 |
| EP | 0736445 A1 * | 10/1996 | | |
| EP | 2615014 B1 * | 3/2021 | ............. | B62D 33/06 |
| JP | 7181076 B2 * | 11/2022 | | |
| RU | 194135 U1 * | 11/2019 | | |
| WO | WO-9207749 A1 * | 5/1992 | ............. | B62D 65/04 |
| WO | WO-2005061314 A1 * | 7/2005 | ............. | B62D 33/06 |
| WO | WO-2013029379 A1 * | 3/2013 | ............. | B62D 33/06 |

* cited by examiner

Primary Examiner — Jacob J Cigna
(74) Attorney, Agent, or Firm — Burris Law, PLLC (57) ABSTRACT

A method of assembling a truck includes assembling a cab structure that includes a rear roof rail coupling a top portion of a rearmost left pillar to a top portion of a rearmost right pillar to cooperate with the rearmost left pillar and the rearmost right pillar to at least partially define a rear opening of the cab structure. The rear opening extends in a vertical direction of the cab structure from the rear roof rail downward beyond a vertical midpoint of the rearmost left and right pillars. The method includes inserting first interior components through the rear opening into an interior of the cab structure and attaching the first interior components to the cab structure. The method includes attaching a rear panel to the rearmost left pillar and the rearmost right pillar after attaching the first interior components to the cab structure, the rear panel spanning the rear opening.

20 Claims, 9 Drawing Sheets

METHOD OF ASSEMBLING A TRUCK

FIELD

The present disclosure relates to a method of assembling a truck and, more specifically, a method of assembling a cab of a truck.

BACKGROUND

The statements in this section merely provide background information related to the present disclosure and may not constitute prior art.

Trucks have a cab, in which occupants ride, that is separated from a bed or cargo area of the truck by a rear wall. Typically, the entire cab structure (i.e., the structural portion of the cab) is assembled and then coated with corrosion resistant materials such as an e-coating and/or paint before any interior components (e.g., wiring, seat belts, HVAC ducts and fans, motors, seats, trim panels, computer modules, carpeting, headliner, instrument panel) are assembled to the structural portion. The different parts of the cab structure (e.g., pillars, sills/rockers, roof rails, roof panel, floor pan, and rear panel) are typically welded together to form a unitary body such that this corrosion coating must be performed after welding all of these parts of the cab structure together. The interior components are then typically inserted into the cab through the door openings and attached to the cab structure.

However, some interior components need to be attached in locations that are hard for an average sized worker to reach when reaching through the door openings, leading to ergonomic issues. Furthermore, the typical process has the cab structure proceeding on the vehicle's main assembly line as components are attached to it. As such, the typical process requires the vehicle's main assembly line to have many different stations, which increases the length of the assembly line and increases the chances for shutdown if any one station has a problem.

The teachings of the present disclosure remedy these and other issues associated with the typical method of assembling trucks.

SUMMARY

This section provides a general summary of the disclosure and is not a comprehensive disclosure of its full scope or all of its features.

In one form, the present disclosure provides for a method of assembling a truck that includes assembling a cab structure of the truck. The cab structure includes a plurality of left pillars, a plurality of right pillars, and a rear roof rail coupling a top portion of a rearmost left pillar of the plurality of left pillars to a top portion of a rearmost right pillar of the plurality of right pillars to cooperate with the rearmost left pillar and the rearmost right pillar to at least partially define a rear opening of the cab structure. The rear opening extends in a vertical direction of the cab structure from the rear roof rail downward beyond a vertical midpoint of the rearmost left and right pillars. The method includes inserting a plurality of first interior components through the rear opening into an interior of the cab structure and attaching the first interior components to the cab structure. The method also includes attaching a rear panel to the rearmost left pillar and the rearmost right pillar after attaching the first interior components to the cab structure, the rear panel spanning the rear opening.

In variations of the system of the above paragraph, which can be implemented individually or in any combination: the method further includes attaching a plurality of second interior components to the rear panel before attaching the rear panel to the rearmost left pillar and the rearmost right pillar; the plurality of second interior components includes at least one of a subwoofer, ducting, an electronic control module, an amplifier, a speaker, cables, wires, a power window module, seat belt components, and an electric motor; the plurality of first interior components includes at least one of a seat, seat belt components, interior trim panels, ducting, cables, wires, a headliner, a floor covering, and an instrument panel; the plurality of first interior components includes a plurality of seats, wherein the method further includes mounting the plurality of seats to a floor pan before inserting the plurality of seats through the rear opening, wherein inserting the plurality of first interior components through the rear opening includes inserting the plurality of seats through the rear opening while the plurality of seats are mounted to the floor pan, and attaching the floor pan to the cab structure; the method further includes painting the cab structure before inserting the plurality of interior components through the rear opening; the method further includes applying a coating to the rear panel before attaching the rear panel to the rearmost left pillar and the rearmost right pillar, the coating including at least one of a corrosion resistant e-coat and a paint coat; the method further includes attaching a rear cross-brace to the cab structure before attaching the rear panel to the rearmost left pillar and the rearmost right pillar, wherein the rear cross-brace extends from the rearmost left pillar to the rearmost right pillar; the rear cross-brace is attached to the cab structure before inserting the plurality of first interior components through the rear opening; the method further includes applying a coating to the cab structure and the rear cross-brace with a corrosion resistant material after attaching the rear cross-brace to the cab structure and before inserting the plurality of first interior components through the rear opening; the method further includes attaching a rear cross-brace to the rear panel before attaching the rear panel to the rearmost left pillar and the rearmost right pillar; the method further includes attaching a rear window pane to the rear panel before attaching the rear panel to the rearmost left pillar and the rearmost right pillar; the method further includes attaching a rear window pane to the rear panel after attaching the rear panel to the rearmost left pillar and the rearmost right pillar; the rear panel is attached to the rearmost left pillar and the rearmost right pillar by a plurality of fasteners and a seal is disposed between the rear panel and the rearmost left pillar and the rearmost right pillar; the method further includes mounting the cab structure to a pair of longitudinal frame rails after attaching the plurality of first interior components to the cab structure; the cab structure further includes a left sill coupling respective bottom portions of the left pillars to define a bottom of at least one door opening on a left side of the cab structure, a right sill coupling respective bottom portions of the right pillars to define a bottom of at least one door opening on a right side of the cab structure, a left roof rail coupling respective top portions of the left pillars to define a top of the at least one door opening on the left side of the cab structure, and a right roof rail coupling respective top portions of the right pillars to define a top of the at least one door opening on the right side of the cab structure.

In another form, the present disclosure provides for a method of assembling a truck including assembling a cab structure of the truck. The cab structure includes a plurality of left pillars and a plurality of right pillars, and a rear roof rail coupling a top portion of a rearmost left pillar of the plurality of left pillars to a top portion of a rearmost right pillar of the plurality of right pillars to cooperate with the rearmost left pillar and the rearmost right pillar to at least partially define a rear opening, the rear opening extending in a vertical direction of the cab structure from the rear roof rail downward beyond a vertical midpoint of the rearmost left and right pillars. The method includes inserting a plurality of first interior components through the rear opening into an interior of the cab structure and attaching the first interior components to the cab structure. The method includes attaching a plurality of second interior components to a rear panel. The method includes attaching the rear panel to the rearmost left pillar and the rearmost right pillar after attaching the first interior components to the cab structure and after attaching the plurality of second interior components to the rear panel, the rear panel spanning the rear opening.

In variations of the system of the above paragraph, which can be implemented individually or in any combination: the method further includes painting the cab structure before inserting the plurality of interior components through the rear opening, and applying a coating the rear panel before attaching the plurality of second interior components to the rear panel; the method further includes attaching a rear window pane to the rear panel before attaching the rear panel to the rearmost left pillar and the rearmost right pillar.

In still another form, the present disclosure provides for a method of assembling a truck that includes assembling a cab structure of the truck. The cab structure includes a plurality of left pillars and a plurality of right pillars, and a rear roof rail coupling a top portion of a rearmost left pillar of the plurality of left pillars to a top portion of a rearmost right pillar of the plurality of right pillars to cooperate with the rearmost left pillar and the rearmost right pillar to at least partially define a rear opening, the rear opening extending in a vertical direction of the cab structure from the rear roof rail downward beyond a vertical midpoint of the rearmost left and right pillars. The method includes painting the cab structure, inserting a plurality of first interior components through the rear opening into an interior of the cab structure after painting the cab structure and attaching the first interior components to the cab structure, applying a coating to a rear panel, attaching a plurality of second interior components to the rear panel after applying the coating the rear panel, attaching the rear panel to the rearmost left pillar and the rearmost right pillar after attaching the first interior components to the cab structure and after attaching the plurality of second interior components to the rear panel, the rear panel spanning the rear opening, and attaching a rear window pane to the rear panel before attaching the rear panel to the rearmost left pillar and the rearmost right pillar.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
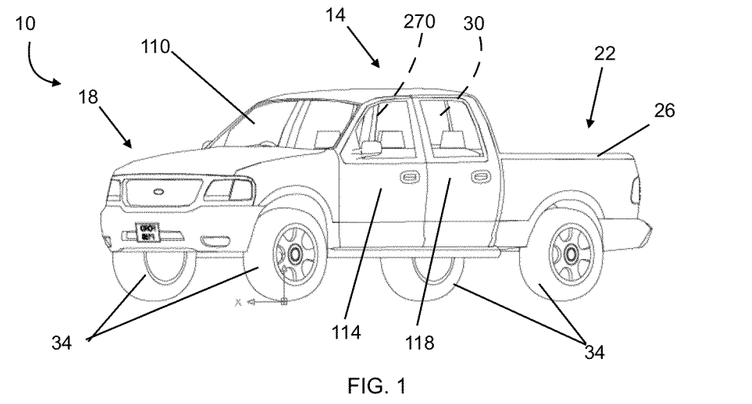
FIG. 1 is a schematic front perspective view of an example truck is illustrated in a fully assembled state.

Referring to FIG. 1, an example truck 10 is illustrated in a fully assembled condition. The truck 10 illustrated is a pickup truck, though other types of trucks with a passenger cab separated from a rear cargo region can be constructed according to the teachings of the present disclosure. The truck 10 generally includes a cab portion 14, a front portion 18 forward of the cab portion 14, a rear portion 22 rearward of the cab portion 14. The front portion 18 may contain powertrain components (e.g., internal combustion engine and/or electric drive motor(s)) and/or may include a front cargo storage cavity commonly known as a "frunk." The rear portion 22 is configured to carry cargo and, in the example provided, includes what is commonly referred to as a truck bed 26 of the truck 10. In the longitudinal direction of the truck 10, the cab portion 14 is between the rear portion 22 and the front portion 18. The cab portion 14 is configured to carry occupants (e.g., a driver and/or passengers).

Figure 2:
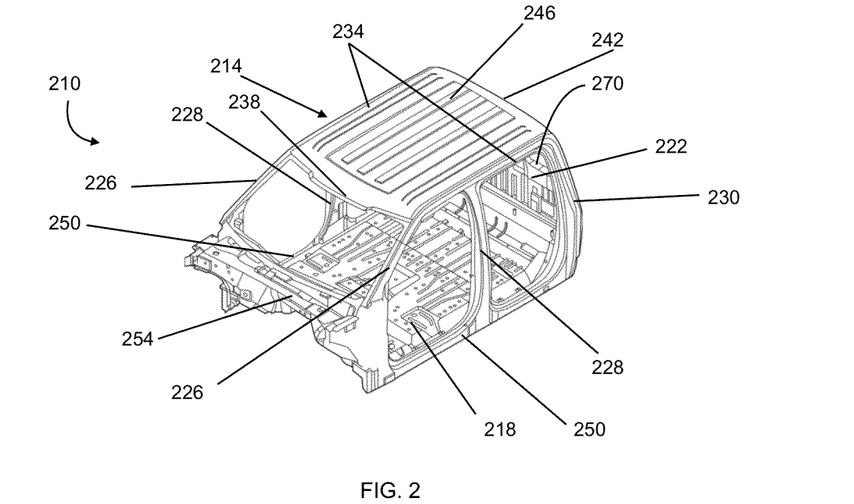
FIG. 2 is a front perspective view of an example cab structure of a truck, illustrated in a typical pre-assembled state before interior components are assembled to the cab structure.

Referring to FIG. 2, a structural assembly 210 of the cab portion 14 is illustrated in a pre-assembled state in which a cab structure 214 is welded to a floor pan 218 and a rear panel 222 to define the full structural assembly 210. During a typical assembly process, this full structural body 210 is welded together and then coated (e.g., corrosion coating and painted) before any interior components (e.g., wiring, seat belts, HVAC ducts and fans, motors, seats, trim panels, computer modules, carpeting, headliner, instrument panel) are attached to the full structural assembly 210.

The cab structure 214 generally includes a plurality of pillars (e.g., A-pillars 226, B-pillars 228, C-pillars 230), a pair of roof rails 234, a front roof cross-member 238, a rear roof cross-member 242, a roof panel 246, a pair of sills 250, and a front wall 254. The left and right A-pillars 226, the front roof cross-member 238, and the top of the front wall 254 cooperate to define a front windshield aperture, in which a front windshield glass pane 110 (FIG. 1) is configured to be inserted. On the left and right sides, the A-pillars 226 and the B-pillars 228 cooperate with corresponding roof rails 234 and sills 250 to define corresponding front door apertures. A front door 114 (FIG. 1) is later hingedly mounted to each A-pillar 226 and configured to close the front door aperture 262. In the example provided, the truck 10 (FIG. 1) has a pair of optional rear doors 118 (FIG. 1). As such, on the left and right sides, the B-pillars 226 and the C-pillars 228 cooperate with corresponding roof rails 234 and sills 250 to define corresponding rear door apertures. The rear doors 118 are later hingedly mounted to either the B-pillar 228 or the C-pillar 230 and configured to close the rear door aperture. In an alternative form, not specifically shown, the truck 10 lacks the middle pillars (i.e., the B-pillars 228) such that it only includes the A-pillars 226 and the rear pillars (i.e., C-pillars 230), though it should be understood that in such a construction the rearmost pillars would be called "B-pillars" and the truck would lack pillars referred to as "C-pillars." In such a construction, the truck 10 may or may not include rear doors 118 hingedly mounted to the rearmost pillar. The roof panel 246 spans laterally between the roof rails 234 and longitudinally between the front roof cross-member 238 and the rear roof cross-member 242 and may or may not include an opening (not shown) for a sun/moon roof (not shown). In some forms, the rear roof cross-member 242 can be integrally formed with the roof panel 246, while in other forms, the roof panel 246 is attached to the rear roof cross-member 242. In some forms, the front roof cross-member 238 can be integrally formed with the roof panel 246, while in other forms, the roof panel 246 is attached to the front roof cross-member 238.

The floor pan 218 is attached to the sills 250 and extends in the longitudinal direction from the rearmost pillars (C-pillars 230) to the A-pillars 226 and may be attached to the bottom of the front wall 254. The rear panel 222 is attached to the rearmost pillars (C-pillars 230) and spans the entire lateral width therebetween. The rear panel 222 is also attached to the floor pan 218 and extends upwards therefrom. In some forms, the rear panel 222 extends fully upward to the rear roof cross-member 242 and defines a rear windshield aperture 270 for a rear windshield glass pane 30 (FIG. 1). In some forms, the rear panel 222 does not define a rear windshield aperture and the truck lacks a rear windshield glass pane. In some forms, the rear panel 222 does not extend fully upward to the rear roof cross-member 242 and the top of the rear panel 222 cooperates with the rearmost pillars (C-pillars 230) and the rear roof cross-member 242 to define the rear windshield aperture 270.

During assembly of a typical truck 10, the structural assembly 210 is fully assembled via welds and then goes through a coating (e.g., corrosion resistant coating and paint) process before it moves to the main assembly line where interior components are then inserted through the door apertures and attached to the structural assembly 210.

In the example provided, the truck 10 is a body-on-frame style vehicle such that the cab structure 214 is mounted to a frame (not shown) of the truck 10, though other types of vehicle architecture can be used (e.g., unibody). The frame is supported relative to the wheels 34 (FIG. 1) via suspension components (not shown; e.g., shocks, springs, struts). In one form, the frame includes a pair of longitudinal frame rails (not shown) that run substantially the length of the truck 10.

Figure 3:
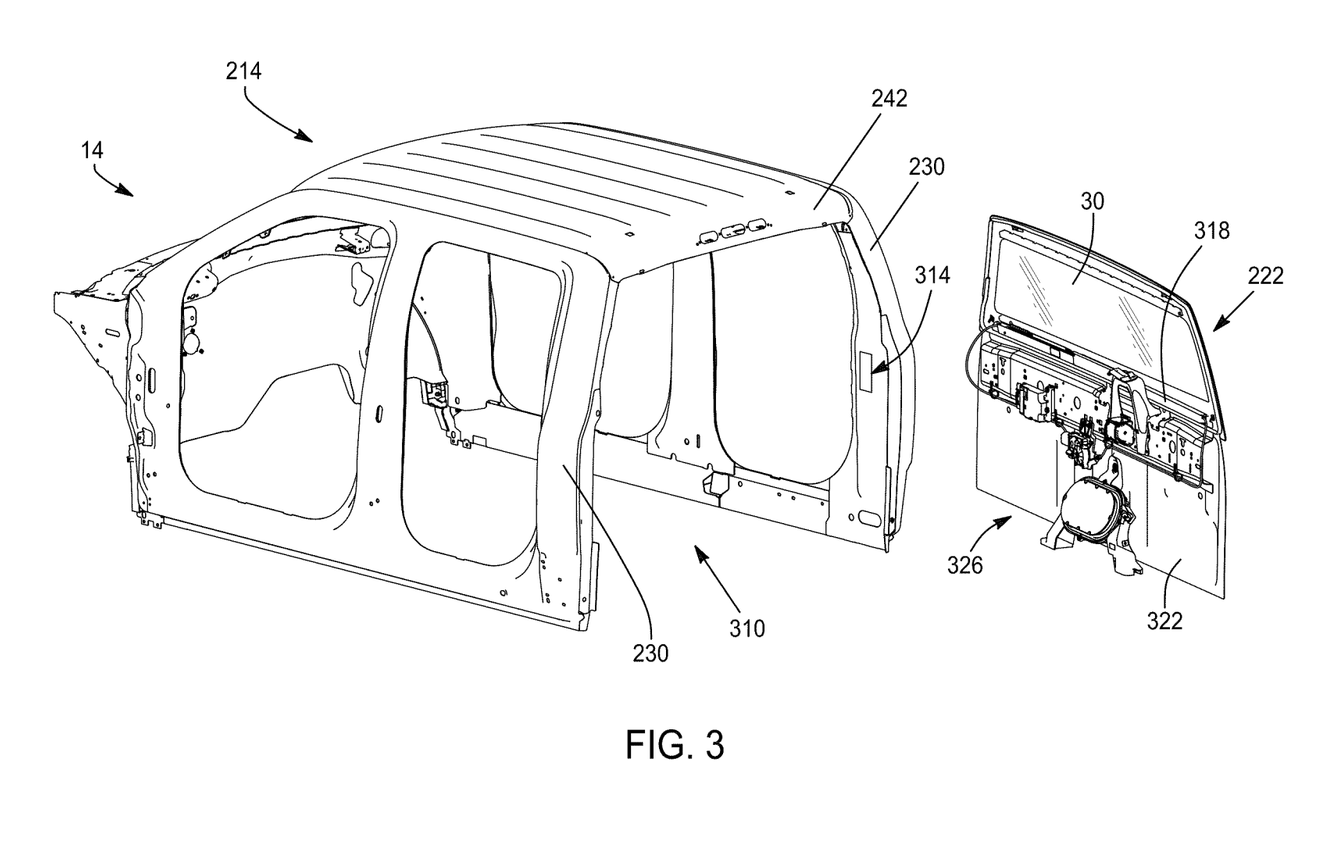
FIG. 3 is a rear perspective view of a cab structure of a truck, illustrated during an assembly step according to the teachings of the present disclosure.
Figure 4:
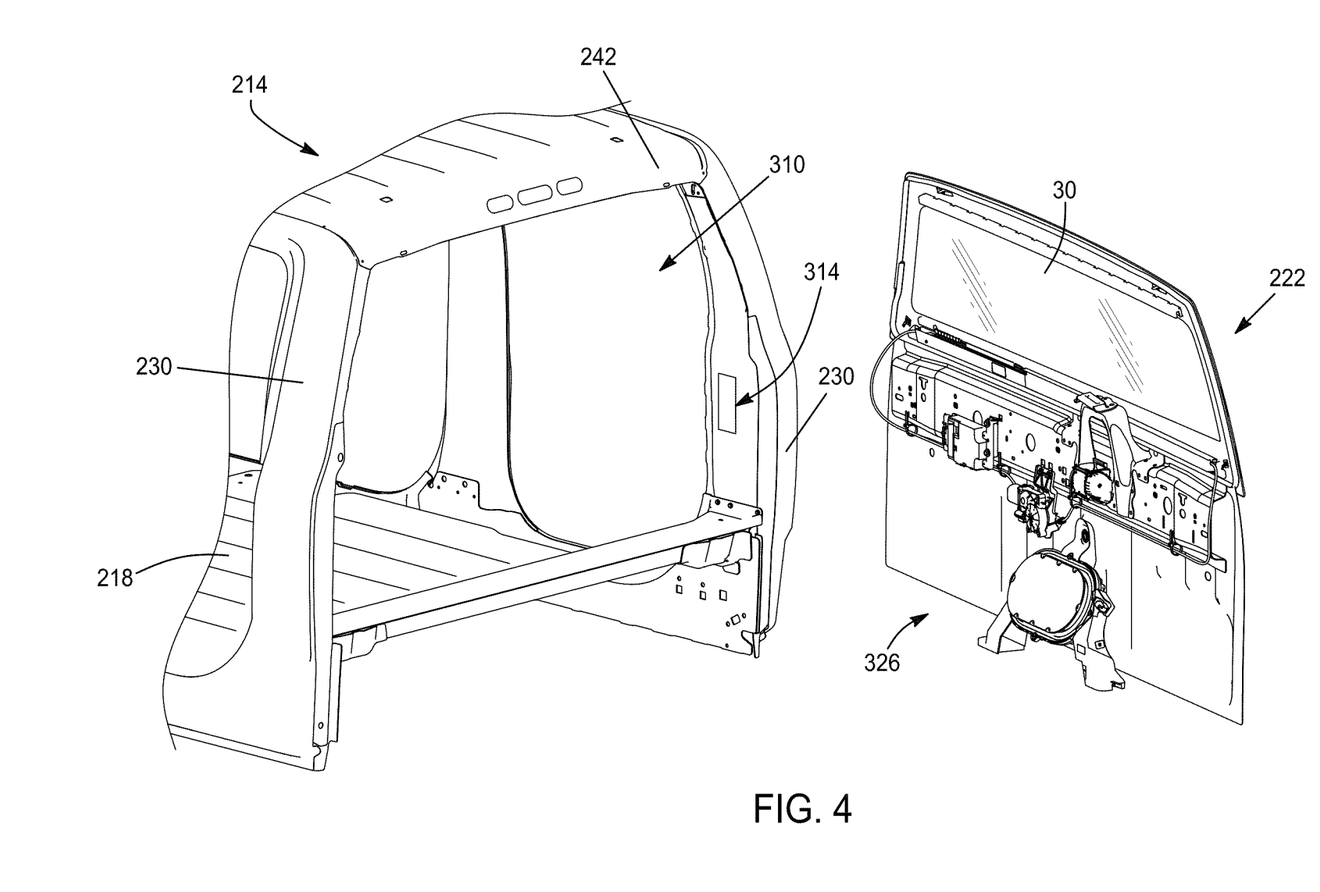
FIG. 4 is a rear perspective view of a cab structure of a truck, illustrated during an assembly step according to the teachings of the present disclosure in which a floor pan is attached to the cab structure.

Referring to FIG. 3, the cab portion 14 is illustrated in a pre-assembled state during an assembly step according to the teachings of the present disclosure and described in greater detail below. In the example provided, the rearmost pillars (C-pillars 230) define the left and right boundaries of a rear opening or aperture 310 of the cab structure 214 while the rear roof cross-member 242 defines the top boundary of the rear aperture 310. In the form shown in FIG. 3, i.e., before the floor pan 218 (FIG. 2) is installed, the rear aperture 310 can be open through the bottom of the cab structure 214. In other words, the rear aperture 310 can extend in the vertical direction from the rear roof cross-member 242 downward to the bottom of the rearmost pillars (C-pillars 230). After the floor pan 218 is installed, as shown in FIG. 4, the floor pan 218 can define a bottom boundary of the rear aperture 310. In other words, the rear aperture 310 can extend in the vertical direction from the rear roof cross member 242 downward to the floor pan 218 when the floor pan 218 is installed.

In the pre-assembled states shown in FIGS. 3 and 4, the rear panel 222 is not attached to the cab structure 214. As such, the rear aperture 310 extends in the vertical direction of the cab structure 214 from the rear roof cross-member 242 downward beyond a vertical midpoint of the rearmost pillars (C-pillars 230). In other words, the rear aperture 310 spans a majority of a total vertical length of the rearmost pillars (C-pillars 230).

In the pre-assembled states shown in FIGS. 3 and 4, the cab structure 214 has been coated (e.g., corrosion coating and/or paint) despite the cab structure 214 not being attached to the rear panel 222. In the example provided in FIG. 4, the floor pan 218 is already attached to the cab structure 214 and has been coated with the cab structure 214. In another form, the floor pan 218 may be separately coated and then attached to the cab structure 214.

Figure 5:
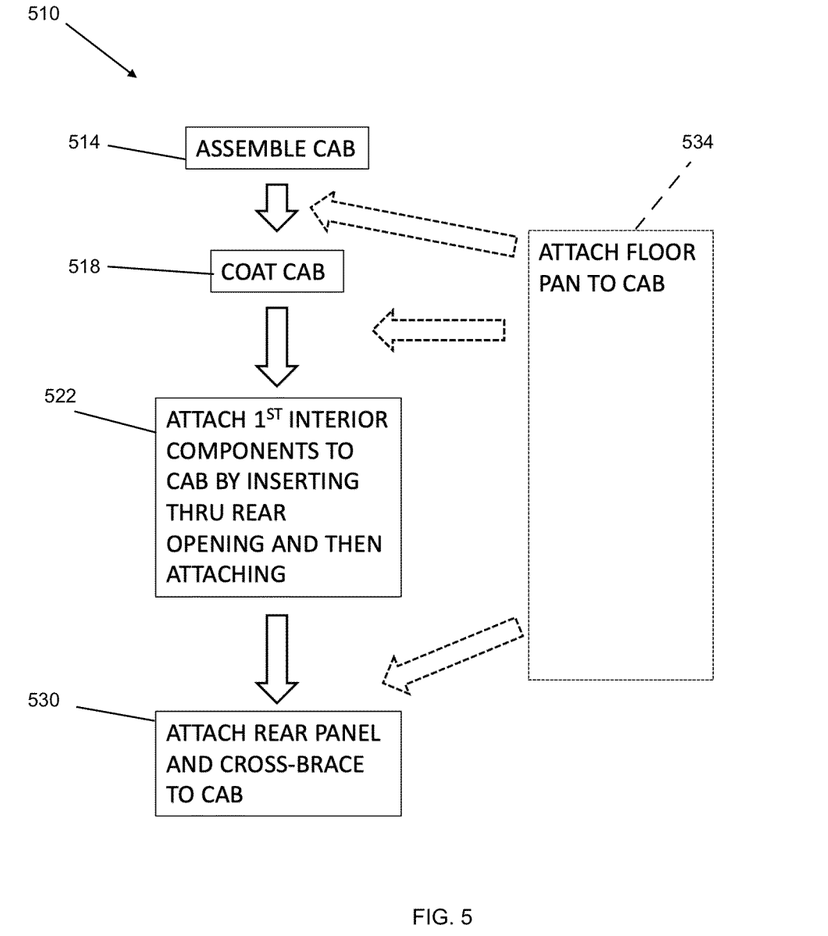
FIG. 5 is a flow chart of a method of constructing a truck according to the teachings of the present disclosure.

Referring to FIG. 5, a method 510 of assembling the truck 10 is schematically illustrated. The method 510 includes step 514, in which the cab structure 214 is assembled. This can be done by welding the pillars (e.g., A-pillars 226, B-pillars 228, C-pillars 230), the pair of roof rails 234, the front roof cross-member 238, the rear roof cross-member 242, the roof panel 246, the pair of sills 250, and the front wall 254 together to form the cab structure 214 discussed above.

The method 510 proceeds to step 518, where the cab structure 214 is coated, as discussed above with an anti-corrosion coating and/or paint. The coating may be different at different parts of the cab structure 214. For example, the coating may include a finish paint coat in some areas while only including an anti-corrosion coating in others.

The method 510 proceeds to step 522, where a plurality of first interior components 314 are inserted through the rear aperture 310 before the rear panel 222 is attached to the cab structure 214. The first interior components 314 can be any suitable components. For example, the first interior components 314 may include, without limitation, wiring, seat belts, HVAC ducts and fans, motors, seats, trim panels, computer modules, carpeting, headliner, instrument panel, speakers, subwoofers, and/or amplifiers. In one form, the cab structure 214 is located on the main assembly line of the truck's 10 assembly factory for step 522. The first interior components 314 are then attached to the cab structure 214.

Figure 9:
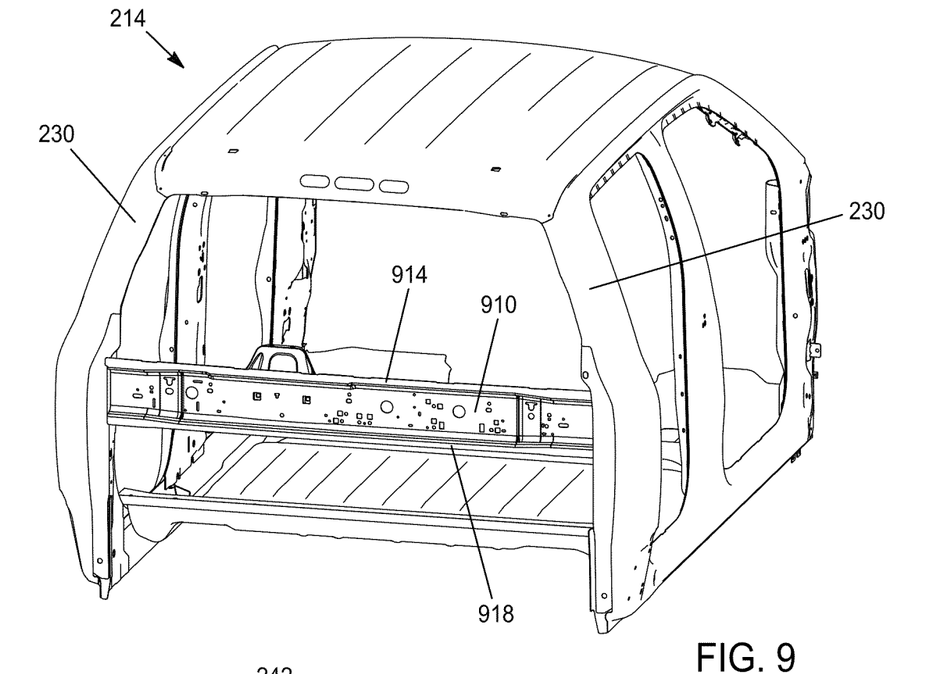
FIG. 9 is a rear perspective view of a cab structure of a truck, illustrated during an assembly step according to the teachings of the present disclosure in which a cross-brace is attached to the cab structure.

The method 510 proceeds to step 530, where the rear panel 222 and a cross-brace 910 (FIG. 9) are attached to the cab structure 214. The cross-brace 910 is a structural member that is attached to the rearmost pillars (C-pillars 230) and spans therebetween. A top edge 914 (FIG. 9) of the cross-brace 910 is below a top edge 318 (FIG. 3) of the rear panel 222 and a bottom edge 918 (FIG. 9) of the cross-brace 910 is above a bottom edge 322 (FIG. 3) of the rear panel 222 and above the floor pan 218.

As shown by step 534 in dashed lines, the floor pan 218 may be attached to the cab structure 214 at any one of several instances during the method 510. In one form, the floor pan 218 is attached to the cab structure 214 before both are coated together. In another form, the floor pan 218 is coated separately and then attached to the cab structure 214 after coating the cab structure 214. In another form, the floor pan 218 is coated separately and then attached to the cab structure 214 after attaching the first interior components 314 to the cab structure 214.

Figure 6:
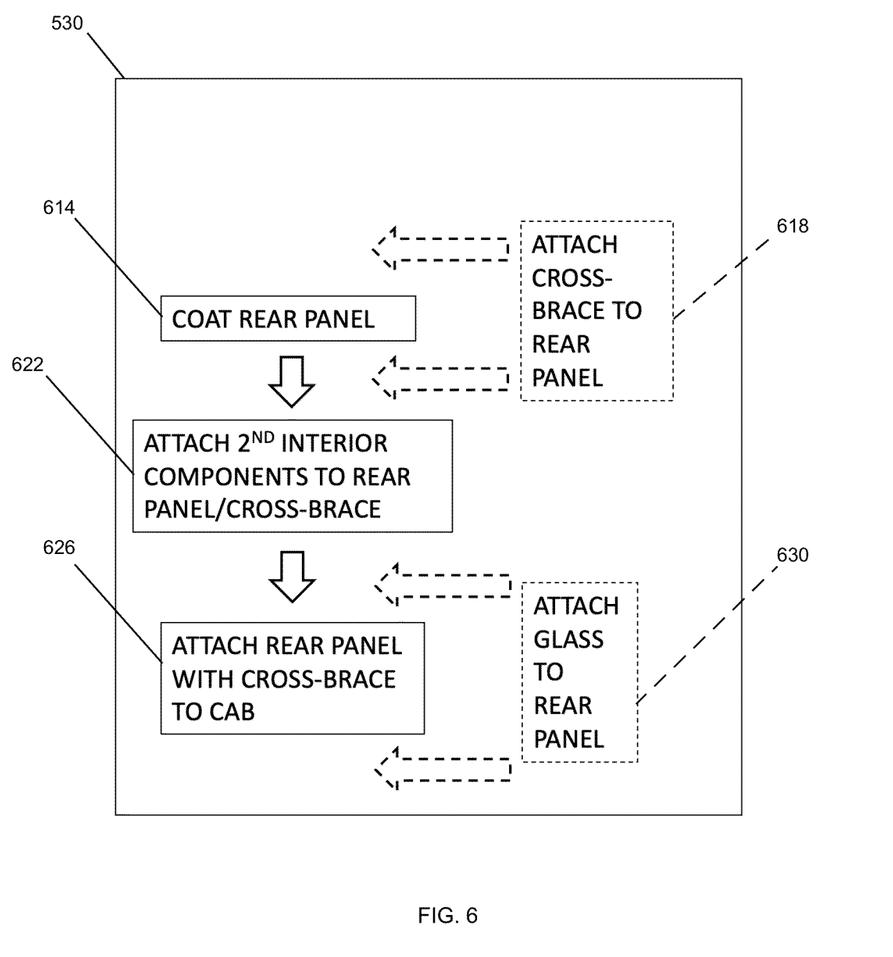
FIG. 6 is a flow chart illustrating one of the steps of the method of FIG. 5 in more detail according to a first form in accordance with the teachings of the present disclosure.

Referring to FIG. 6, one form of step 530 is illustrated in greater detail. In this form, attaching the rear panel 222 and cross-brace 910 to the cab structure 214 includes step 614. At step 614, the rear panel 222 is coated (e.g., anti-corrosion coating and/or painted) separately from the cab structure 214. As shown by step 618 in dashed lines, the cross-brace 910 may be attached to the rear panel 222 before the rear panel 222 is coated such that the cross-brace 910 is coated with the rear panel 222 or the cross-brace 910 may be attached to the rear panel 222 after the rear panel 222 is coated. In one form, the cross-brace 910 is coated separately from the rear panel 222 and connected there to after step 614. In another form, the cross-brace 910 is formed of a composite material (e.g., carbon fiber, fiberglass, or plastic composite) and is not coated and is attached to the rear panel 222 after coating the rear panel 222. In forms in which the cross-brace 910 is attached prior to the coating the rear panel 222, the cross-brace 910 may be attached via welding, adhesives, rivets, screws, and/or bolts. In forms in which the cross-brace 910 is attached after coating the rear panel 222, the cross-brace 910 is attached via adhesives, rivets, screws, and/or bolts.

In the form shown in FIG. 6, step 530 proceeds to step 622, where a plurality of second interior components 326 are attached to the rear panel 222 and/or the cross-brace 910. The second interior components 326 can be any suitable components. For example, the second interior components 326 may include, without limitation, wiring, seat belts, HVAC ducts and fans, motors, trim panels, computer modules, speakers, subwoofers, and/or amplifiers.

This form of step 530 proceeds to step 626, where the rear panel 222 with the attached cross-brace 910 are attached to the cab structure 214 via adhesives, rivets, screws, and/or bolts.

As shown by step 630 in dashed lines, the rear windshield glass pane 30 may be attached to the rear panel 222 before or after step 626. The rear windshield glass pane 30 may be attached by any suitable method such as fasteners and/or adhesive.

Figure 10:
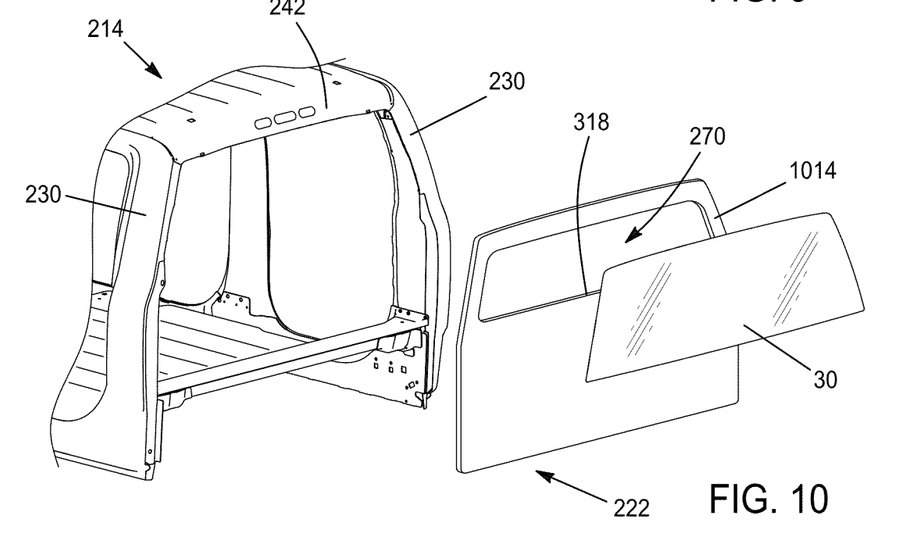
FIG. 10 is a rear perspective view of a cab structure of a truck, illustrated during an assembly step according to the teachings of the present disclosure in which a rear panel includes a border defining a rear windshield aperture.

In one form, shown in FIG. 10 the rear panel 222 has a border 1014 that extends fully up to and attaches to the rear roof cross-member 242. The border 1014 and the top edge 318 of the rear panel 222 define the rear windshield aperture 270. The rear windshield glass pane 30 is attached to the border 1014 and the top edge 318.

Figure 11:
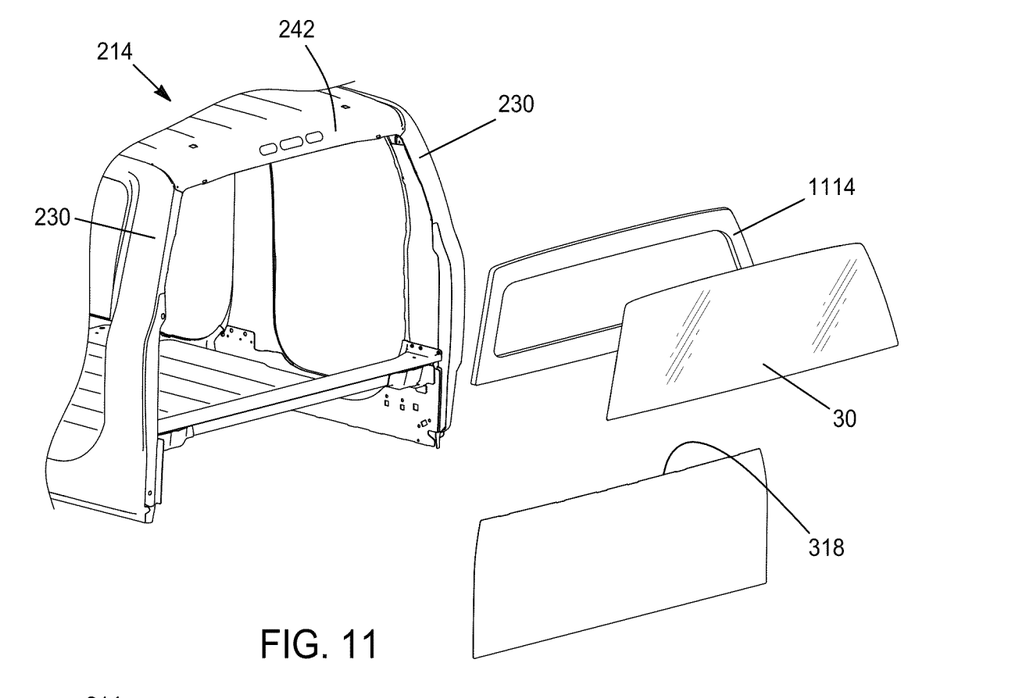
FIG. 11 is a rear perspective view of a cab structure of a truck, illustrated during an assembly step according to the teachings of the present disclosure in which a border piece defines a rear windshield aperture separate from a rear panel.

In another form, the rear panel 222 lacks the border 1014 and ends in the vertical direction at the top edge 318. In this form, the rear windshield aperture 270 is defined by the top edge 318, the rearmost pillars (C-pillars 230), and the rear roof cross-member 242. The rear windshield glass pane 30 can then be attached to the top edge 318, the rearmost pillars (C-pillars 230), and the rear roof cross-member 242. In one form, shown in FIG. 11, a separate border piece 1114 is mounted to the top edge 318, the rearmost pillars (C-pillars 230), and the rear roof cross-member 242 to provide a continuous surface to which the rear windshield glass pane 30 can be attached and sealed.

Figure 7:
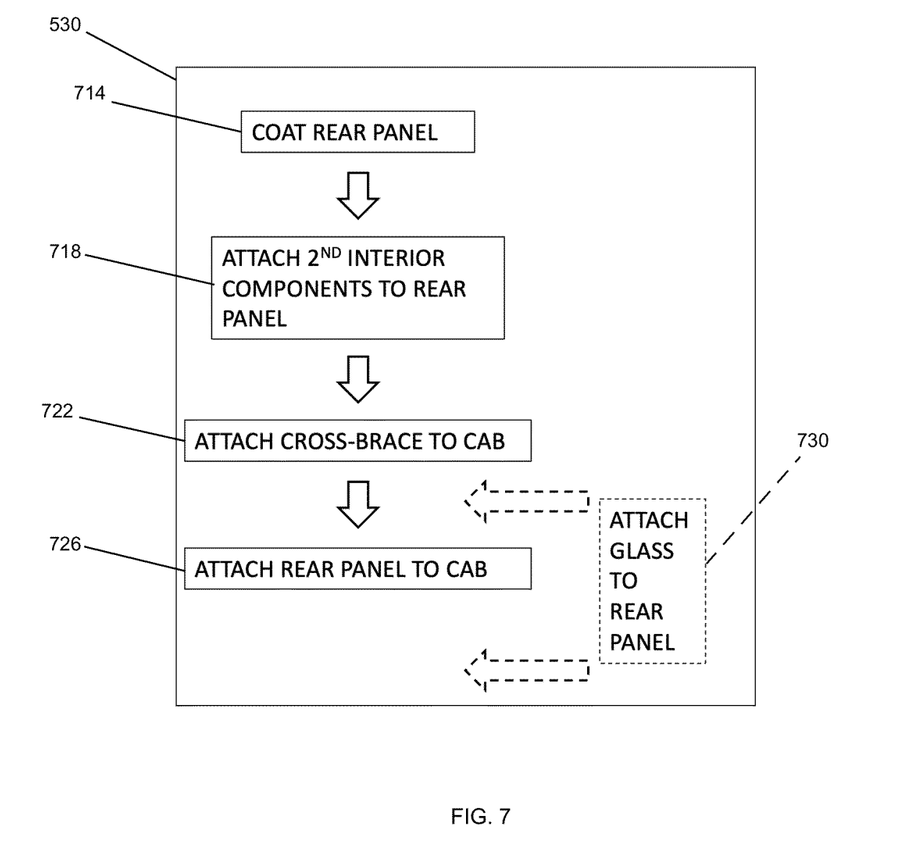
FIG. 7 is a flow chart illustrating one of the steps of the method of FIG. 5 in more detail according to a second form in accordance with the teachings of the present disclosure.

Referring to FIG. 7, another form of step 530 is illustrated in greater detail. In this form, the cross-brace 910 is not attached to the rear panel 222 before the rear panel 222 is attached to the cab structure 214. Instead, at step 714, the rear panel 222 is coated (e.g., anti-corrosion coating and/or painted) separately from the cab structure 214.

This form of step 530 proceeds to step 718, where the plurality of second interior components 326 are attached to the rear panel 222. Some other ones of the second interior components 326 may optionally be attached to the cross-brace 910, which is separate from the rear panel 222 at this step.

In this form, step 530 proceeds to step 722, where the cross-brace 910 is attached to the cab structure 214 while the rear panel 222 is still separate from the cab structure 214.

This form of step 530 proceeds to step 726, where the rear panel 222 is attached to the cab structure 214. The rear panel 222 can also be attached to the cross-brace 910 in addition to the cab structure 214. The rear panel 222 can cover or enclose the cross-brace 910 within the cab structure 214.

In this form, as shown by step 730 in dashed lines, the rear windshield glass pane 30 can be attached to the rear panel 222 before the rear panel 222 is attached to the cab structure 214 or the rear windshield glass pane 30 can be attached to the rear panel 222 after the rear panel 222 is attached to the cab structure 214.

In one form, shown in FIG. 10 the rear panel 222 has the border 1014 that extends fully up to and attaches to the rear roof cross-member 242. The border 1014 and the top edge 318 of the rear panel 222 define the rear windshield aperture 270. The rear windshield glass pane 30 is attached to the border 1014 and the top edge 318.

In another form, the rear panel 222 lacks the border 1014 and ends in the vertical direction at the top edge 318. In this form, the rear windshield aperture 270 is defined by the top edge 318, the rearmost pillars (C-pillars 230), and the rear roof cross-member 242. The rear windshield glass pane 30 can then be attached to the top edge 318, the rearmost pillars (C-pillars 230), and the rear roof cross-member 242. In one form, shown in FIG. 11, a separate border piece 1114 is mounted to the top edge 318, the rearmost pillars (C-pillars 230), and the rear roof cross-member 242 to provide a continuous surface to which the rear windshield glass pane 30 can be attached and sealed.

Figure 8:
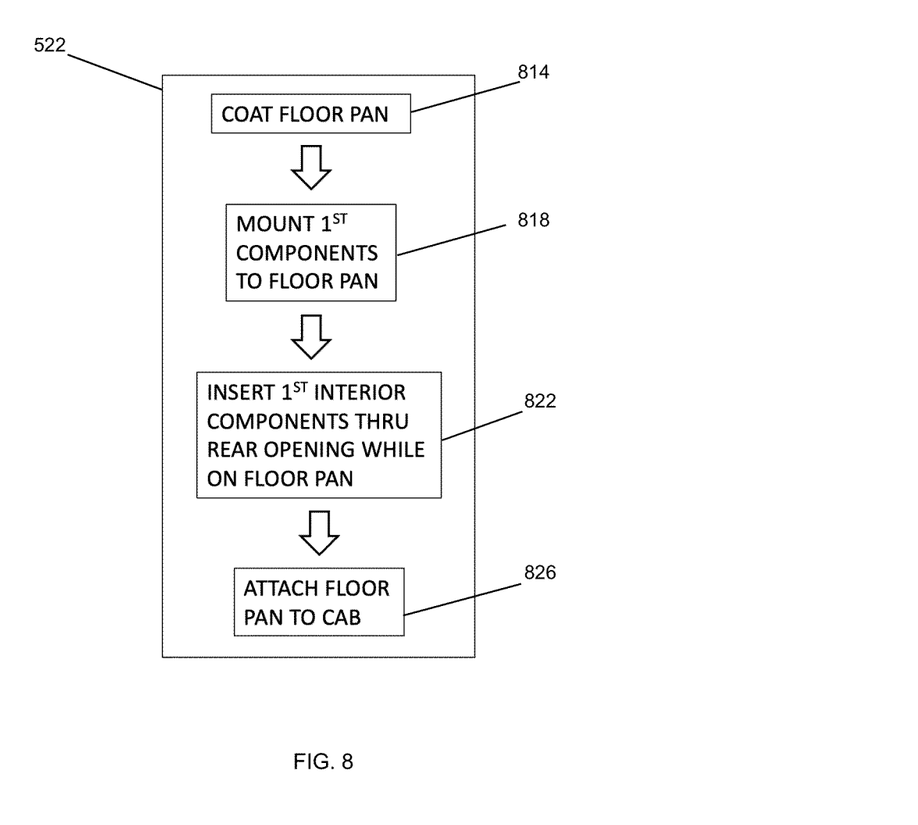
FIG. 8 is a flow chart illustrating a different one of the steps of the method of FIG. 5 in more detail in accordance with the teachings of the present disclosure.

Referring to FIG. 8, one form of step 522 is illustrated in greater detail. In this form, step 522 includes step 814, where the floor pan 218 is coated (e.g., anti-corrosion coating and/or paint) separately from the cab structure 214.

Figure 12:
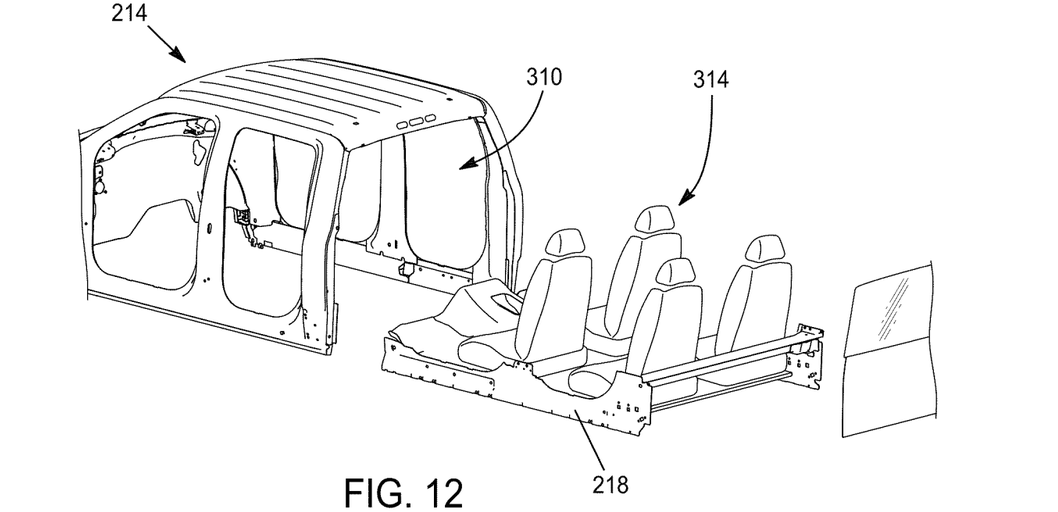
FIG. 12 is a rear perspective view of a cab structure of a truck, illustrated during an assembly step according to the teachings of the present disclosure in which a plurality of interior components are attached to a floor pan before the floor pan is attached to the cab structure.

Step 522 proceeds to step 818, where a plurality of the first interior components 314 (e.g., seats, carpet, console, instrument panel, ducting, wiring) are attached to the floor pan 218 while the floor pan 218 is separate from the cab structure 214, as shown in FIG. 12.

Step 522 proceeds to step 822, where the floor pan 218 with the first interior components 314 attached thereto form a modular interior that is then moved at least partially through the rear aperture 310 into position within the cab structure 214.

Step 522 proceeds to step 826, where the floor pan 218 is attached to the cab structure 214.

In this form, while some of the first interior components 314 are attached to the floor pan 218, some additional first interior components 314 may optionally be inserted through the rear aperture 310 and attached to the cab structure 214 independent of the floor pan 218.

In an alternative form, the floor pan 218 is attached to the cab structure 214 before attaching any interior components to it and the first interior components 314 are inserted through the rear aperture 310 and attached to the cab structure and/or the floor pan 218.

The method 510 described herein can reduce the number of stations on the main assembly line of the truck 10. For example, step 622 or 718 may be done at a workstation away from the main assembly line. As such, fewer main assembly line stations are needed for installing interior components. Likewise, when step 630 or 730 is performed before step 626 or 726, the rear windshield glass pane 30 can be attached to the rear panel 222 at a workstation away from the main assembly line. Similarly, step 818 may be done at a workstation away from the main assembly line.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of assembling a truck, the method comprising:
   assembling a cab structure of the truck, the cab structure including:
      a plurality of left pillars and a plurality of right pillars; and
      a rear roof rail coupling a top portion of a rearmost left pillar of the plurality of left pillars to a top portion of a rearmost right pillar of the plurality of right pillars to cooperate with the rearmost left pillar and the rearmost right pillar to at least partially define a rear opening of the cab structure, the rear opening extending in a vertical direction of the cab structure from the rear roof rail downward beyond a vertical midpoint of the rearmost left and right pillars;
   inserting a plurality of first interior components through the rear opening into an interior of the cab structure and attaching the first interior components to the cab structure;
   attaching a rear panel to the rearmost left pillar and the rearmost right pillar after attaching the first interior components to the cab structure, the rear panel spanning the rear opening; and
   mounting the cab structure to a pair of longitudinal frame rails after attaching the plurality of first interior components to the cab structure.

2. The method according to claim 1, wherein the plurality of first interior components includes at least one of a seat, seat belt components, interior trim panels, ducting, cables, wires, a headliner, a floor covering, and an instrument panel.

3. The method according to claim 1, wherein the plurality of first interior components includes a plurality of seats, wherein the method further comprises:
   mounting the plurality of seats to a floor pan before inserting the plurality of seats through the rear opening, wherein inserting the plurality of first interior components through the rear opening includes inserting the plurality of seats through the rear opening while the plurality of seats are mounted to the floor pan; and
   attaching the floor pan to the cab structure.

4. The method according to claim 1, wherein the rear panel is attached to the rearmost left pillar and the rearmost right pillar by a plurality of fasteners and a seal is disposed between the rear panel and the rearmost left pillar and the rearmost right pillar.

5. The method according to claim 1, wherein the cab structure further includes:
   a left sill coupling respective bottom portions of the left pillars to define a bottom of at least one door opening on a left side of the cab structure;
   a right sill coupling respective bottom portions of the right pillars to define a bottom of at least one door opening on a right side of the cab structure;
   a left roof rail coupling respective top portions of the left pillars to define a top of the at least one door opening on the left side of the cab structure; and
   a right roof rail coupling respective top portions of the right pillars to define a top of the at least one door opening on the right side of the cab structure.

6. The method according to claim 1, further comprising:
   attaching a plurality of second interior components to the rear panel before attaching the rear panel to the rearmost left pillar and the rearmost right pillar.

7. The method according to claim 6, wherein the plurality of second interior components includes at least one of a subwoofer, ducting, an electronic control module, an amplifier, a speaker, cables, wires, a power window module, seat belt components, and an electric motor.

8. The method according to claim 1, further comprising:
   painting the cab structure before inserting the plurality of interior components through the rear opening.

9. The method according to claim 8, further comprising:
   applying a coating to the rear panel before attaching the rear panel to the rearmost left pillar and the rearmost right pillar, the coating including at least one of a corrosion resistant e-coat and a paint coat.

10. The method according to claim 1, further comprising:
    attaching a rear cross-brace to the rear panel before attaching the rear panel to the rearmost left pillar and the rearmost right pillar, wherein attaching the rear panel to the rearmost left pillar and the rearmost right pillar includes attaching the rear cross-brace to the rearmost left pillar and the rearmost right pillar.

11. The method according to claim 10, further comprising:
attaching a rear window pane to the rear panel before attaching the rear panel to the rearmost left pillar and the rearmost right pillar.

12. The method according to claim 10, further comprising:
attaching a rear window pane to the rear panel after attaching the rear panel to the rearmost left pillar and the rearmost right pillar.

13. The method according to claim 1, further comprising:
attaching a rear cross-brace to the cab structure before attaching the rear panel to the rearmost left pillar and the rearmost right pillar, wherein the rear cross-brace extends from the rearmost left pillar to the rearmost right pillar and spans the rear opening.

14. The method according to claim 13, wherein the rear cross-brace is attached to the cab structure before inserting the plurality of first interior components through the rear opening.

15. The method according to claim 14, further comprising:
applying a coating to the cab structure and the rear cross-brace with a corrosion resistant material after attaching the rear cross-brace to the cab structure and before inserting the plurality of first interior components through the rear opening.

16. A method of assembling a truck, the method comprising:
assembling a cab structure of the truck, the cab structure including:
a plurality of left pillars and a plurality of right pillars; and
a rear roof rail coupling a top portion of a rearmost left pillar of the plurality of left pillars to a top portion of a rearmost right pillar of the plurality of right pillars to cooperate with the rearmost left pillar and the rearmost right pillar to at least partially define a rear opening of the cab structure, the rear opening extending in a vertical direction of the cab structure from the rear roof rail downward beyond a vertical midpoint of the rearmost left and right pillars;
mounting a seat to a floor pan;
moving the floor pan with the seat mounted thereto into position relative to the cab structure such that at least a portion of the seat is inserted through the rear opening into an interior of the cab structure;
attaching the floor pan to the cab structure; and
attaching a rear panel to the rearmost left pillar and the rearmost right pillar after moving the floor pan into position relative to the cab structure, the rear panel spanning the rear opening.

17. The method according to claim 16, further comprising:
painting the cab structure before inserting the plurality of interior components through the rear opening; and
applying a coating the rear panel before attaching the plurality of second interior components to the rear panel.

18. The method according to claim 16, further comprising:
attaching a rear window pane to the rear panel before attaching the rear panel to the rearmost left pillar and the rearmost right pillar.

19. The method according to claim 16, further comprising:
attaching a rear cross-brace to the cab structure before attaching the rear panel to the rearmost left pillar and the rearmost right pillar, wherein the rear cross-brace extends from the rearmost left pillar to the rearmost right pillar and spans the rear opening.

20. A method of assembling a truck, the method comprising:
assembling a cab structure of the truck, the cab structure including:
a plurality of left pillars and a plurality of right pillars; and
a rear roof rail coupling a top portion of a rearmost left pillar of the plurality of left pillars to a top portion of a rearmost right pillar of the plurality of right pillars to cooperate with the rearmost left pillar and the rearmost right pillar to at least partially define a rear opening, the rear opening extending in a vertical direction of the cab structure from the rear roof rail downward beyond a vertical midpoint of the rearmost left and right pillars;
painting the cab structure;
inserting a plurality of first interior components through the rear opening into an interior of the cab structure after painting the cab structure and attaching the first interior components to the cab structure;
applying a coating to a rear panel;
attaching a plurality of second interior components to the rear panel after applying the coating the rear panel;
attaching the rear panel to the rearmost left pillar and the rearmost right pillar after attaching the first interior components to the cab structure and after attaching the plurality of second interior components to the rear panel, the rear panel spanning the rear opening; and
attaching a rear window pane to the rear panel before attaching the rear panel to the rearmost left pillar and the rearmost right pillar.

* * * * *